United States Patent [19]

Kohler

[11] Patent Number: 4,635,775
[45] Date of Patent: Jan. 13, 1987

[54] FASTENING DEVICES FOR FRICTION CLUTCHES

[75] Inventor: Helmut Kohler, Bühlertal, Fed. Rep. of Germany

[73] Assignee: Luk Lamellen und Kupplungsbau GmbH, Baden, Fed. Rep. of Germany

[21] Appl. No.: 509,171

[22] Filed: Jun. 29, 1983

[30] Foreign Application Priority Data

Jun. 30, 1982 [DE] Fed. Rep. of Germany ....... 3224403

[51] Int. Cl.⁴ .............................................. F16D 13/58
[52] U.S. Cl. .............................. 192/70.18; 192/109 R; 411/40; 411/45
[58] Field of Search .................... 192/70.18, 109 R; 411/39, 40, 41, 44, 45

[56] References Cited

U.S. PATENT DOCUMENTS

| | | | |
|---|---|---|---|
| 2,085,167 | 6/1937 | Nutt | 192/70.18 |
| 2,253,344 | 8/1941 | Nutt et al. | 192/70.18 |
| 3,118,526 | 1/1964 | Wolfram | 192/70.18 |
| 3,167,163 | 1/1965 | Smirl et al. | 192/70.18 |
| 3,283,864 | 11/1966 | Motsch | 192/68 |
| 3,450,241 | 6/1969 | Kuno | 192/70.18 |
| 3,765,295 | 10/1973 | Ptak | 411/41 |
| 3,939,951 | 2/1976 | Sink et al. | 192/70.18 |
| 4,114,740 | 9/1978 | Sugiura et al. | 192/70.18 |

FOREIGN PATENT DOCUMENTS

| | | |
|---|---|---|
| 632384 | 5/1963 | Fed. Rep. of Germany . |
| 1925053 | 7/1965 | Fed. Rep. of Germany . |
| 1600093 | 4/1970 | Fed. Rep. of Germany . |
| 766223 | 3/1955 | United Kingdom . |

*Primary Examiner*—Ronald C. Capossela
*Attorney, Agent, or Firm*—Peter K. Kontler

[57] ABSTRACT

A friction clutch wherein the leaf springs which confine the pressure plate to axial movement relative to the housing are secured to the pressure plate by fastening devices having solid or tubular connecting elements a first portion of each of which is anchored in a discrete blind bore of the pressure plate and each of which extends outwardly through and beyond an opening in the respective leaf spring. Those portions of the connecting elements which extend outwardly beyond the openings of the respective leaf springs are deformed to constitute rivet heads which overlie the leaf springs and hold them against movement away from the respective surface of the pressure plate. Such mode of fastening the leaf springs to the pressure plate allows for a reduction of the radial dimensions and weight and enhances the safety of the clutch, especially as concerns the bursting strength of the pressure plate.

49 Claims, 13 Drawing Figures

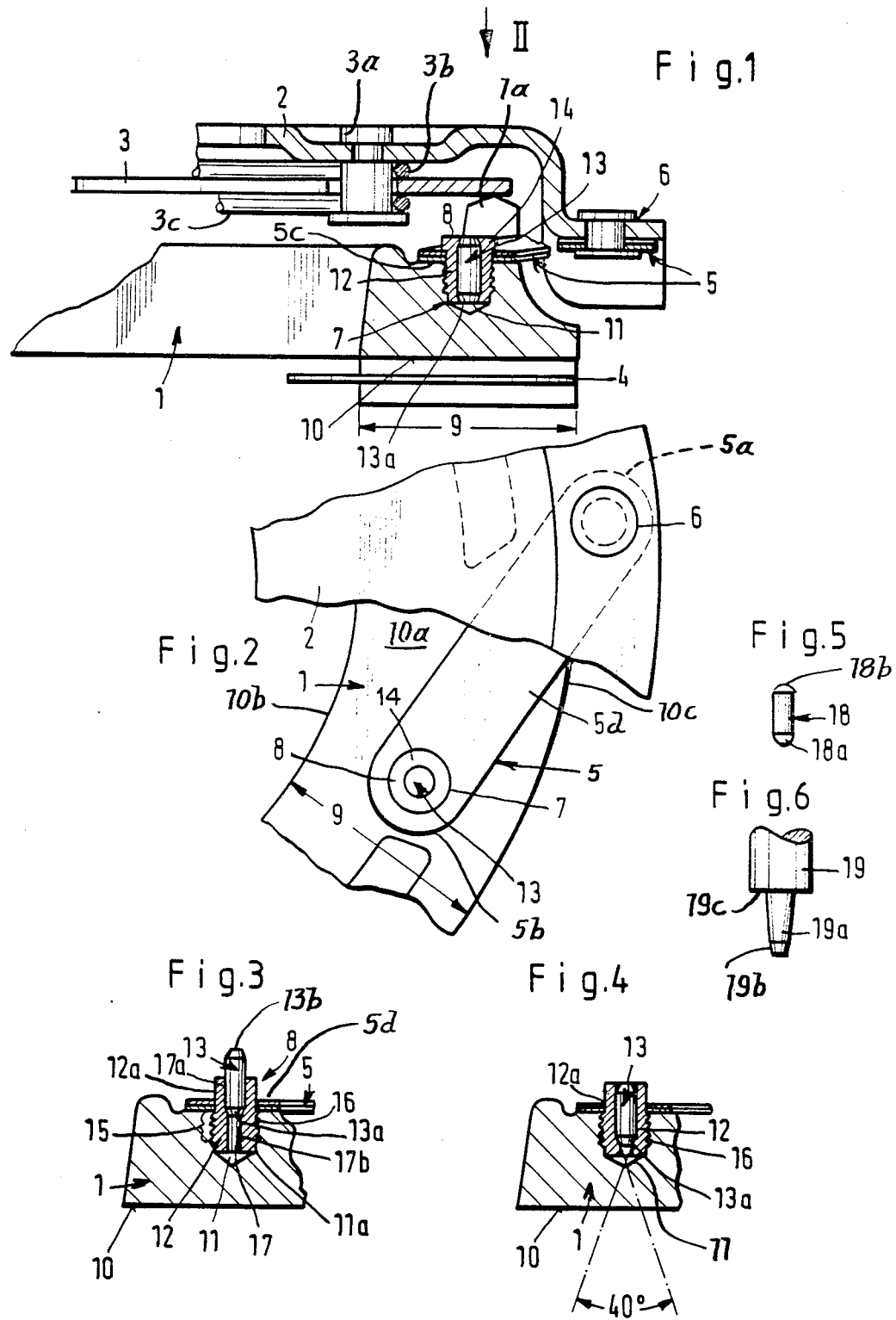

FASTENING DEVICES FOR FRICTION CLUTCHES

CROSS-REFERENCE TO RELATED CASE

The friction clutch which is disclosed in the present application is similar to the friction clutch described in my commonly owned copending patent application Ser. No. 509,190 filed June 29, 1983 for "Friction clutch and method of assembling its parts".

BACKGROUND OF THE INVENTION

The present invention relates to friction clutches in general, especially to friction clutches for use in motor vehicles, and more particularly to improvements in friction clutches of the type wherein certain components are non-rotatably but axially movably coupled to each other by leaf springs or other deformable coupling means.

It is well known to construct a friction clutch in such a way that a diaphragm spring or another suitable energy storing device urges a pressure plate against the friction lining of a clutch plate or disc, and that the pressure plate is axially movably but non-rotatably secured to the clutch housing, e.g., to a cover of the housing, by several equidistant sets of leaf springs which are deformable in directions to allow for axial movements of the pressure plate under or against the bias of the diaphragm spring. Reference may be had, for example, to German Offenlegungsschrift No. 1,600,093 which discloses a friction clutch of the just outlined character. In the clutch of this German publication, the pressure plate is provided with equidistant projections (as considered in the circumferential direction of the clutch) which extend radially outwardly and each of which is connected with one end portion of a leaf spring by means of a rivet. The other end portions of the leaf springs are connected to the housing of the friction clutch. The orientation of the leaf springs is such that they allow the pressure plate to move axially of the housing but that the pressure plate and the housing are held against angular movement with reference to one another. The shanks of the rivets extend through openings which are provided therefor in the respective end portions of the leaf springs. The shank of each rivet also extends through a hole in the respective projection of the pressure plate, and the rivets have heads adjacent to those sides of the projections which face away from the respective leaf springs. The space requirements of the rivet heads at the exterior of the pressure plate contribute to the axial dimensions of the friction clutch. Moreover, the radial projections (which are provided for the express purpose of supporting the respective end portions of the leaf springs) contribute to the dimensions of the friction clutch, as considered in the radial direction of the clutch housing. This creates problems in many types of compact vehicles where the space is at a premium and, moreover, the projections of the pressure plate contribute to the weight of the clutch. Still further, centrifugal force acting upon the projections renders it necessary to increase the weight, mass and bulk of the circular main portion of the pressure plate in order to ensure that such main portion can stand the developing stresses even if the pressure plate is rotated at a very high speed. The standards regarding the resistance of pressure plates to bursting are very high and must be met by the component parts of friction clutches which are intended for use in motor vehicles and the like.

Another mode of securing the end portions of leaf springs to an axially movable pressure plate in a friction clutch is disclosed in U.S. Pat. No. 3,283,864 granted Nov. 8, 1966 to Motsch. The fastening means comprises rivets extending through that portion of the pressure plate which bears against the clutch disc when the clutch is to transmit torque. To this end, the pressure plate is formed with an annulus of through holes in the region of its friction generating surface, and each hole has an enlarged portion at that end which terminates in the friction surface. The shank of each rivet extends through the opening of the respective leaf spring and through the smaller-diameter portion of the respective hole in the pressure plate, and each rivet has a head in the larger-diameter portion of the respective hole. A drawback of such proposal is that the making of holes in the annular portion of the pressure plate reduces the area of the friction surface (namely, of the surface which engages the adjacent lining of the clutch disc when the clutch is engaged), especially since the larger-diameter ends of such holes terminate at the friction surface. This means that the remaining portion of the friction surface is subjected to more pronounced wear, especially in the regions between neighboring holes, and the friction surface is likely to develop pronounced channels or furrows after a relatively short period of use. The development of furrows in the friction surface adversely influences the torque transmitting action because it affects the frictional engagement between such surface and the adjacent lining of the clutch disc. Still further, weakening of the pressure plate due to the provision of through holes in the friction surface entails localized accumulations of heat with attendant development of internal stresses and distortion of the pressure plate. The distortion can be so pronounced that it prevents a disengagement of the pressure plate from the clutch disc and/or delays such disengagement and/or allows for mere partial disengagement of such parts from one another. Moreover, localized accumulations of heat in the regions of through holes are likely to entail the development of cracks which, in turn, can cause the pressure plate to burst during rotation within the higher RMP range.

A further mode of fastening leaf springs to the pressure plate of a friction clutch is disclosed in German Utility Model No. 1,925,053. The fastening means includes hollow screws which extend into tapped bores of the pressure plate. A drawback of such proposal is that vibrations which are bound to develop when the friction clutch is in use in a motor vehicle or the like cause the screws to become loose and to thus put not only the clutch but also the entire vehicle out of commission. Loosening of screws in the pressure plate is believed to be attributable to the absence of accurate mesh between the external threads of the screws and the internal threads of the pressure plate, i.e., to the absence of reliable and uniform transmission of forces between the pressure plate and the springs. This results in overstressing, and excessive wear upon certain portions, of the windings of the threads with attendant loosening of the screws and a breakdown of the connection between the leaf springs and the pressure plate. A further drawback of the just described fastening means is that the dimensions of openings in the leaf springs must be selected with utmost accuracy in order to prevent wobbling of the leaf springs with reference to the shanks of the screws. Any wobbling of the leaf springs would even further increase the likelihood of rapid loosening of the screws and would also result in pronounced wear upon the material of the leaf springs around the respective openings. This would entail immediate or rapid separation of leaf springs from the pressure plate.

OBJECTS AND SUMMARY OF THE INVENTION

An object of the invention is to provide a novel and improved connection between certain components of a friction clutch, especially between the housing and the axially movable pressure plate of a friction clutch for use in motor vehicles.

Another object of the invention is to provide novel and improved means for fastening the end portions of leaf springs or analogous deformable coupling members to the pressure plate of a friction clutch in such a way that the connections are more reliable, longer lasting, simpler and less expensive than the aforediscussed and other conventional connections.

A further object of the invention is to provide simple, compact and inexpensive fastening means of the above outlined character which contribute little, if anything, to the weight and bulk of the clutch, not only in the radial but also in the axial direction, and which can stand vibrations and other stray movements of component parts of the clutch more readily than heretofore known fastening means.

An additional object of the invention is to provide fastening means which can be assembled and applied with little loss in time and by resort to relatively simple tools.

A further object of the invention is to provide a friction clutch which embodies one or more fastening means of the above outlined character.

Another object of the invention is to provide a motor vehicle embodying a clutch which features one or more fastening means of the aforedescribed character.

Still another object of the invention is to provide a novel and improved connecting element which can be converted into or which can constitute a component part of the fastening device.

A further object of the invention is to provide a fastening device which not only reduces the likelihood of separation of leaf springs from the pressure plate and contributes to a reduction of the space requirements of the pressure plate (as considered in the axial and radial directions of the clutch), but which also enhances the bursting strength of the pressure plate and does not require any reduction in the area of friction surface of the pressure plate, namely, that surface which bears against the clutch disc when the clutch is engaged to transmit torque from a part which drives the clutch disc to a part which is driven by the pressure plate or vice versa.

The invention resides in the provision of a friction clutch, particularly for use in motor vehicles, which comprises at least substantially coaxial first and second rotary components the first of which is movable axially with reference to the second component, and a deformable coupling member having a first portion secured to one of the components and a second portion provided with an opening and overlying the other component. The other component has a first surface which faces the second portion of the coupling member and has a blind bore provided in the first surface in register with the opening of the second portion of the coupling member. An outer side or surface of the coupling member faces away from the other component, and the clutch further comprises novel and improved means for fastening the second portion of the coupling member to the other component. Such fastening means comprises an elongated connecting element which preferably consists of a ductile metallic material and is anchored in the blind bore of the other component. The connecting element extends outwardly through and beyond the opening in the second portion of the coupling member, and the connecting element includes a deformed portion which overlies the outer side of the coupling member in the region around the opening. The other component can constitute the axially movable pressure plate of the clutch and is then provided with a second surface constituting a friction surface and facing away from the coupling member. The one component can constitute or form part of the housing of the friction clutch and the coupling member preferably comprises an elongated leaf spring. Such clutch further comprises a clutch disc which is adjacent to the friction surface of the pressure plate and a clutch spring (e.g., a diaphragm spring) which reacts against the housing and serves to bear against the pressure plate so as to urge the latter toward engagement with the clutch disc. The pressure plate can constitute or resemble an annulus with inner and outer peripheral surfaces which flank the first and second surfaces of the pressure plate, and the blind bore can be disposed substantially midway between the two peripheral surfaces. In practically all instances, the clutch comprises two or more leaf springs so that the first surface of the pressure plate is formed with a plurality of preferably equidistant blind bores, one for each leaf spring, and the clutch comprises a discrete fastening means for each leaf spring.

The deformed portion of the connecting element preferably constitutes or resembles a rivet head. The connecting element further comprises an at least partially radially expanded second portion engaging with that (internal) surface of the pressure plate which surrounds the blind bore. The internal surface of the pressure plate can be threaded, at least in part, and the second portion of the connecting element can have an external thread which mates with the thread of such internal surface. The thread in the internal surface of the pressure plate can be formed by the external thread of the second portion of the connecting element or vice versa.

The connecting element can further comprise a larger-diameter additional portion which is disposed between the open end of the blind bore and the second portion of the leaf spring, i.e., between the first surface of the pressure plate and the inner side of the second portion of the leaf spring. Such additional portion can include or constitute a collar which overlies the first surface of the pressure plate in the region surrounding the open end of the blind bore. The additional portion can constitute a means for limiting the extent to which the connecting element extends into the blind bore of the pressure plate. If the first surface of the pressure plate is uneven (e.g., because the pressure plate is a casting and the first surface is an untreated surface of the casting), that surface of the additional portion of the connecting element which is adjacent to the pressure plate is preferably complementary to the uneven first surface so that the two surfaces oppose rotation of the connecting element with reference to the pressure plate.

If the connecting element is in mesh with the pressure plate, it can be provided with detachable or permanent means for facilitating its rotation by a suitable torque transmitting tool. Such rotation facilitating means can be separated from the remainder of the connecting element in response to the application of a predetermined torque which suffices to shear the rotation facilitating means off the remainder of the connecting element. In such instance, the rotation facilitating means preferably constitutes that end portion of the connecting element which is remote from the blind bore and is outwardly adjacent to the outer side of the second portion of the leaf spring when the connecting element is in the process of being anchored in the bore of the pressure plate. The rotation facilitating means can have a polygonal outline (e.g., a square or hexagonal outline so that it can be engaged by any one of a wide variety of available torque transmitting tools). Alternatively, the rotation facilitating means can have a transverse slot, not unlike a conventional screw. Still further, the rotation facilitating means can have an end face provided with a polygonal recess for reception of the working end of a suitable torque transmitting tool. Still further, the rotation facilitating means can comprise or constitute the aforementioned additional portion (collar) of the connecting element, i.e., such rotation facilitating means can be disposed between the second portion of the leaf spring and the first surface of the pressure plate. The second portion of the connecting element is then inserted into the blind bore in a first step (i.e., by rotating the collar so that the external thread of the second portion moves into mesh with the thread of the internal surface of the pressure plate), and the second portion of the leaf spring is thereupon slipped over the exposed part of the connecting element so that it comes to rest on the collar. Such collar can have two or more peripheral facets or flats; e.g., the collar can have a hexagonal outline.

At least that portion of the connecting element which is disposed outside of the blind bore can be formed with an axial passage or recess which is preferably bounded by a non-circular (most preferably polygonal) internal surface of the connecting element so that it can receive the complementary polygonal working end of a torque transmitting device.

In accordance with a modification, that (internal) surface of the pressure plate which surrounds the blind bore can have a threaded first portion which is remote from the open end of the bore and an at least substantially smooth second portion nearer to the open end of the bore. The second portion of the connecting element then includes an externally threaded part in mesh with the thread of the first portion of the internal surface and a radially expanded part which is in engagement with and is surrounded by the second portion of the internal surface.

If the second portion of the connecting element is radially expanded into engagement with the internal surface of the pressure plate and/or with the surface surrounding the opening in the second portion of the leaf spring, radial expansion of such second portion of the connecting element is normally attributable to and can take place at least substantially simultaneously with deformation of the deformed portion of the connecting element. For example, the tool which effects deformation of the exposed part of the connecting element adjacent to the outer side of the second portion of the leaf spring can also serve to effect radial expansion of a part of or the entire second portion of the connecting element in the blind bore of the pressure plate. If the internal surface of the pressure plate is at least partially uneven (e.g., threaded), the second portion of the connecting element is preferably expanded into form-locking engagement with the internal surface, i.e., the external surface of the second portion of the connecting element conforms to the uneven internal surface of the pressure plate.

The connecting element can be formed with an axially extending socket, and the fastening means then preferably further comprises a substantially pin-shaped spreading or expanding element which is received in the socket and serves to expand the second portion of the connecting element against the internal surface of the pressure plate and/or to expand a part of the connecting element into engagement with the surface surrounding the opening in the second portion of the leaf spring. The socket can have an open end in the deformed portion of the connecting element and can constitute a through hole or passage extending axially through the entire connecting element so that the latter can be said to constitute or resemble a tube. In accordance with a presently preferred embodiment, the socket (in undeformed condition of the connecting element) has a larger-diameter first portion in the part located externally of the blind bore and a smaller-diameter portion in the blind bore. The spreading element is first inserted into the larger-diameter portion and is thereupon driven into the smaller-diameter portion to effect radial expansion of the second portion of the connecting element against the internal surface of the pressure plate.

The spreading element can be provided with a tapering front end portion which is disposed in the interior of the blind bore when the spreading element is driven into the socket of the connecting element. Such leading end portion can constitute or include the frustum of a cone having an apex angle of preferably between 30 and 60 degrees, most preferably about 40 degrees, to facilitate convenient introduction of the spreading element into the socket. Alternatively, the leading end portion of the spreading element can constitute or resemble a hemisphere.

If the connecting element is a tube, the deformed portion of the connecting element can be formed as a result of introduction of the spreading element into such tube.

The trailing end portion of the spreading element (i.e., that portion which is remotest from the closed end of the blind bore) can constitute or resemble the frustum of a cone or a hemisphere and is preferably embedded in the material of the deformed portion when the spreading element is driven home. In this manner, the deformed portion of the connecting element prevents axial migration of the spreading element outwardly and away from the blind bore.

The pressure plate can be provided with a stop (such stop can constitute a shoulder in the blind bore) which can arrest the end face of the second portion of the connecting element when the latter is received in the blind bore to a desired extent.

The opening in the second portion of the leaf spring has an outline which preferably deviates from a circular outline. This ensures that, when the opening is filled with the ductile material of the connecting element, the leaf spring cannot turn about the axis of the anchored connecting element.

The novel features which are considered as characteristic of the invention are set forth in particular in the appended claims. The improved fastening means itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary axial sectional view of a friction clutch wherein an end portion of a package of overlapping leaf springs is fastened to an axially movable pressure plate of the clutch in accordance with a first embodiment of the invention;

FIG. 2 is a fragmentary plan view of the friction clutch, as seen in the direction of arrow II in FIG. 1;

FIG. 3 illustrates a detail in the structure of FIG. 1 and shows the initial stage of driving a spreading element into the socket of a connecting element which forms part of the improved fastening means;

FIG. 4 illustrates the structure of FIG. 3 but shows the spreading element during a further stage of introduction into the socket of the connecting element;

FIG. 5 is a side elevational view of a modified spreading element;

FIG. 6 is a side elevational view of a spreading tool which can be used to expand a portion of the connecting element into requisite engagement with the pressure plate and with the leaf spring, and which can also serve to deform the outermost part of the connecting element;

DESCRIPTION OF THE PREFERRED EMBODIMENTS

Figure 7:
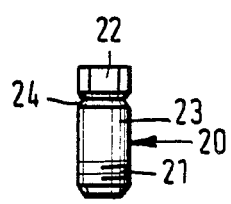
FIG. 7 is a side elevational view of a modified connecting element.

Referring first to FIGS. 1 and 2, there is shown a portion of a friction clutch for use in motor vehicles or the like. The clutch comprises a housing 2 which overlies an annular pressure plate 1 and supports a diaphragm spring 3. The latter serves to bear against the axially extending protuberances 1a of the pressure plate 1 and to urge a friction surface 10 of the pressure plate into frictional engagement with the adjacent clutch disc or clutch plate 4. The diaphragm spring 3 is secured to the housing 2 by an annulus of rivets 3a which further hold and center two ring-shaped seats 3b, 3c for the adjacent portion of the spring 3. The pressure plate 1 is movable axially of the housing 2 and, to this end, is secured to the housing by a set of coupling members in the form of elongated leaf springs 5. Each leaf spring 5 has a first end portion 5a which is fixedly secured to the marginal portion of the housing 2 by a rivet 6, and a second end portion 5b which is fixedly secured to the pressure plate 1 by a novel fastening device 7. The fastening devices 7 urge the undersides or inner sides of the respective leaf springs 5 against the adjacent surface 10a of the pressure plate 1.

FIG. 3 shows the details of one of the fastening devices 7. This device comprises a tubular connecting component 12 which consists of plastically deformable (ductile) metallic material and extends through a non-circular opening 5c in the second end portion 5b of the illustrated leaf spring 5 and also into a blind bore 11 in the surface 10a of the pressure plate 1. The blind bore 11 is in register with the opening 5c, and the connecting element 12 is introduced into the opening 5c and blind bore 11 in a direction from that (exposed) side or surface (5d) of the leaf spring 5 which faces away from the pressure plate 1. When the insertion and anchoring of the connecting element 12 in the opening 5c and blind bore 11 is completed, the element 12 resembles a part of a rivet, namely, a rivet with a single head 14 constituting the deformed outer end portion of the tubular portion or shank 12a. The blind bore 11 is preferably disposed substantially midway between the inner and outer peripheral surfaces 10b and 10c of the pressure plate 1. The reference character 9 denotes the width of the friction surface 10. It will be noted that the innermost part 11a of the blind bore 11 terminates well short of the friction surface 10, i.e., the latter is not affected by the provision of blind bores in the opposite surface 10a.

The fastening device 7 of FIG. 3 further comprises a substantially pin-shaped spreading or expanding element 13 which is driven into an axially extending passage or socket 17 of the connecting element 12 to thereby effect a radial expansion of at least a part of the portion 12a of the connecting element 12 in the blind bore 11 so that the connecting element is held in pronounced frictional force-locking engagement with the material of the pressure plate 1 and cannot be extracted therefrom. The deformed outer end portion 14 of the connecting element 12 bears against the exposed side 5d of the leaf spring 5 and maintains the end portion 5b in contact with the surface 10a of the pressure plate 1. The outer diameter of the deformed outer end portion 14 need not appreciably exceed the maximum dimension of the opening 5c in the end portion 5b of the leaf spring 5. The outer end portion 14 resembles the head of a rivet and is formed as a result of deformation of the outermost part of the connecting element 12, for example, during or subsequent to last stage of forcible introduction of the spreading element 13 into the socket 17. The length of the connecting element 12 is selected in such a way that the tubular portion 12a can extend all the way to the deepmost or innermost part 11a of the blind bore 11 and that the upper end portion of the element 12 then still contains a sufficient quantity of deformable material at a level above the upper side 5d of the leaf spring 5 to allow for the shaping of an adequate head 14. The reference character 8 denotes the exposed end face of the head 14; this end face can be flush with the upper end of the fully inserted spreading element 13.

The manner in which the fastening device 7 is assembled and the portion 12a of its connecting element 12 anchored in the blind bore 11 of the pressure plate 1 as well as in the opening 5c of the end portion 5b of the leaf spring 5 is shown in FIGS. 3 and 4. At least a portion of the internal surface of the pressure plate 1 (namely, of the surface surrounding the blind bore 11) is preferably uneven. For example, this internal surface can be provided with one or more threads 16 extending along a portion 15 of the blind bore 11, preferably along that portion which is immediately adjacent to the surface 10a of the pressure plate 1. The portion 12a of the connecting element 12 is insertable into the blind bore 11 without any effort or with a relatively small effort to simplify the assembly of the fastening device 7. The socket 17 in the connecting element 12 includes several portions having different diameters, e.g., a larger-diameter portion 17a at the upper end and a smaller-diameter portion 17b at the lower end of the connecting element 12, as viewed in FIG. 3. As also shown in FIG. 3, a certain part of the connecting element 12 extends upwardly and above the upper side 5d of the leaf spring 5 when the still undeformed element 12 is fully inserted into the blind bore 11. The lower end portion or leading end 13a of the spreading element 13 preferably resembles a cone, most preferably the frustum of a cone with an apex angle of between 30 and 60 degrees, preferably 40 degrees. This end portion 13a is inserted into the larger-diameter portion 17a of the socket 17, and the upper part of the connecting element 12 extends through and upwardly beyond the opening 5c, i.e., beyond the exposed upper side 5d of the leaf spring 5. The operator then resorts to a suitable tool which is employed to drive the spreading element 13 deeper into the socket 17 so that the end portion 13a penetrates into and expands the smaller-diameter portion 17b and thus effects radial expansion of the tubular lower portion 12a of the connecting element 12 into intimate contact with the adjacent internal surface of the pressure plate 1, i.e., the material of the portion 12a fills the groove or grooves of the thread 16 in the blind bore 11 to thus establish a highly reliable connection between the pressure plate and the connecting element 12. The just mentioned tool need not be manipulated by a person, i.e., it can be caused to perform a working stroke in a suitable automatic or semiautomatic machine whose construction and mode of operation form no part of the present invention.

FIG. 4 illustrates an intermediate stage of introduction of the spreading element 13 into the socket 17, and FIG. 1 shows the spreading element 13 in fully inserted condition. In the intermediate position of the spreading element 13 (FIG. 4), the connecting element 12 is already anchored in the blind bore 11 of the pressure plate 1 because the radial expansion of the portion 12a has progressed sufficiently to ensure that the portion 12a develops external threads which mate with the internal threads 16 of the pressure plate. The larger-diameter central or main portion of the spreading element 13 has further caused at least some of the material of the portion 12a to expand in and to fill or nearly fill the opening 5c in the respective end portion 5b of the leaf spring 5. However, the latter is yet to be permanently secured to the pressure plate 1 because the outer diameter of the exposed part of the connecting element 12 is still such that it can or possibly could pass through the opening 5c. Such permanent attachment of the end portion 5b to the pressure plate 1 is effected by the same tool which drives the spreading element 13 into the socket 17 or by a discrete second tool, not shown. At any rate, when the deformation of the connecting element 12 is completed, the upper end portion of this element forms the aforementioned rivet head 14 which overlies a part of the upper side 5d around the respective opening 5c and thus ensures that the underside of the leaf spring 5 bears against the surface 10a of the pressure plate 1. Also, such deformation of the uppermost part of the connecting element 12 ensures that the material of the portion 12a definitely fills the opening 5c and thus prevents angular movements of the leaf spring 5 about the axis of the fastening device 7, particularly if the opening 5c has an outline which deviates from that of a circle. The rivet head forming tool can complete the introduction of the spreading element 13 into the socket 17 so that the upper end face of the fully introduced spreading element is flush with the exposed surface 8 of the freshly formed head 14. As shown in FIG. 3, the upper or outer end portion 13b of the spreading element 13 can constitute a mirror image of the end portion 13a so that it is immaterial which end portion of the spreading element 13 is introduced into the larger-diameter portion 17a of the socket 17. The provision of an outer end portion (13b) which is a mirror image of the end portion 13a is desirable and advantageous on the additional ground that the cross-sectional area of such end portion decreases upwardly, as viewed in FIGS. 1, 3 or 4 and, consequently, the material of the head 14 can completely surround the upwardly tapering circumferential surface of the end portion 13b to thus prevent axial movement of the fully inserted spreading element 13 upwardly and away from the position shown in FIG. 1. Thus, the rivet head forming tool can be designed in such a way that it completes the introduction of the spreading element 13 into the socket 17, that it converts the exposed uppermost part of the connecting element 12 into a head 14, and also that it causes the material of the head 14 to snugly surround the end portion 13b of the fully inserted spreading element. All of the spreading elements 13 can be introduced in a simultaneous operation, and the same preferably holds true for conversion of the uppermost parts of all connecting elements 12 into heads 14 of annular or analogous shape.

To summarize: The spreading element 13 can be partially inserted into the socket 17 of the respective connecting element 12 in a first step and by resorting to a first tool, and the introduction of the spreading element 13 into the socket 17 can be completed by a second tool which preferably also serves to convert the uppermost part of the connecting element 12 into a rivet head 14. Alternatively, a first tool can be used to fully insert the spreading element 13 into the socket 17, and a second tool can be employed to thereupon convert the exposed uppermost part of the connecting element 12 into a rivet head 14. Still further, two or more tools can be used to introduce the spreading element 13, and the last of these tools (or a separate tool) can be used to provide the connecting element 12 with the head 14. At any rate, at least some radial expansion of the tubular lower portion 12a of the connecting element 12 can take place during that stage of assembly of the fastening device 7 when the exposed outermost part of the connecting element is in the process of being converted into a rivet head 14 which snugly surrounds the frustoconical outer end portion 13b of the fully inserted spreading element 13.

The conical front end portion 13a of the spreading element 13 facilitates predictable introduction of the spreading element 13 into the socket 17 and hence a predictable radial expansion of the portion 12a into requisite form-locking engagement with the internal surface surrounding a portion of or the entire blind bore 11, particularly that portion which is formed with the internal thread 16 or with an otherwise configurated unevenness of the pressure plate 1.

The diameter of the innermost portion 11a of the blind bore 11 preferably decreases toward the axis of the blind bore, as considered in a direction away from the open end of the blind bore, so that the surface surrounding the bore 11 in the region where the innermost portion 11a begins forms a shoulder which constitutes a stop for the end face of the lower portion 12a during insertion of the connecting element 12 into the blind bore.

FIG. 5 illustrates a modified pin-shaped spreading or expanding element 18 which can be used in lieu of the spreading element 13. The element 18 has a cylindrical central or main portion of constant or nearly constant diameter, a first end portion 18a which resembles a hemisphere and is a functional equivalent of the end portion 13a, and a second or outer end portion 18b which is a mirror image of the end portion 18a and performs the same function as the end portion 13b, i.e., the end portion 18b can be practically or fully buried in the material of the head 14 when the conversion of the uppermost part of the connecting element 12 into a rivet head is completed.

The dimensions of the openings 5c in the end portions 5b of the leaf springs 5 can be selected in such a way that, during assembly of the fastening devices 7, the connecting elements 12 are inserted into the respective blind bores 11 in a first step, such insertion is followed by slipping of the end portions 5b over the exposed parts of the respective connecting elements so that the undersides of the end portions 5b lie on the surface 10a of the pressure plate 1, and such steps are thereupon followed by introduction of the spreading elements 13 or 18 in the aforedescribed manner and the conversion of uppermost parts of connecting elements 12 into rivet heads 14.

FIG. 6 illustrates a portion of a device including a substantially conical or pyramidal spreading or expanding tool 19a which can be used to effect a radial expansion of tubular portions 12a and is thereupon extracted so that the finished fastening device consists of a single part, namely, a connecting element 12 having a tubular portion 12a the major part of which is expanded in the blind bore 11 and in the registering opening 5c and the outermost part of which is converted into a rivet head 14. Thus, the tool 19a can be used to perform the function of a spreading element 13 or 18 but is extracted from the fully expanded and deformed connecting element 12 as soon as the radial expanding and head forming steps are completed. The tool 19a has a tip 19b which can resemble the tip or end portion 13a of the spreading element 13 or the end portion 18a of the spreading element 18. Also the handle or support 19 for the tool 19a is provided with a shoulder 19c which can be used as a means for converting the uppermost part of the radially expanded connecting element 12 into a rivet head 14. Thus, the structure of FIG. 6 can serve as a means for effecting radial expansion of the tubular portion 12a in the blind bore 11 and in the registering opening 5c as well as for effecting conversion of the exposed uppermost part of the connecting element 12 into a rivet head 14.

If desired or necessary, the socket which remains open upon extraction of the tool 19a from a fully expanded and deformed connecting element 12 can be filled with a mass of hardenable plastic material or the like to further reduce the likelihood of radial contraction of the tubular portion 12a subsequent to extraction of the tool 19a.

Figure 8:
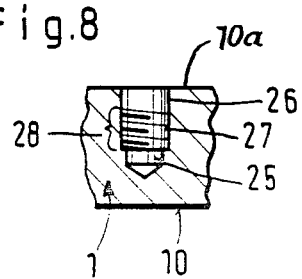
FIG. 8 is a fragmentary sectional view of a pressure plate which has a blind bore adapted to receive a portion of a connecting element of the type shown in FIG. 7.
Figure 9:
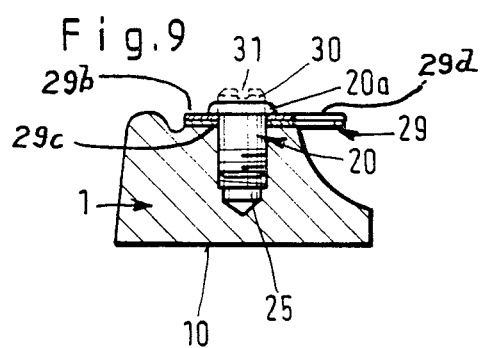
FIG. 9 is a fragmentary sectional view of the pressure plate of FIG. 8 and shows the fastening device including the connecting element of FIG. 7 in fully inserted position.

FIG. 7 shows a modified connecting element 20 which can be converted into a fastening device embodying a further form of the invention. The connecting element 20 comprises an externally threaded end portion 21, a polygonal rotation facilitating end portion 22 which can be engaged by a wrench or another suitable tool to rotate the connecting element, and a weakened portion which is formed with a circumferential groove 24 and separates the polygonal end portion 22 from a radially expandible median or intermediate portion 23 disposed between the end portions 21 and 22. The pressure plate 1 (note FIGS. 8 and 9) has a blind bore 25 which is machined into its surface 10a and extends toward but short of the friction surface 10 which contacts the clutch disc when the clutch embodying the pressure plate of FIGS. 8 and 9 is engaged. The internal surface surrounding the blind bore 25 includes a smooth cylindrical portion 26 which is adjacent to the surface 10a and an internally threaded portion 27 having an axial length 28 exceeding the axial length of the externally threaded portion 21 of the connecting element 20. The internally threaded portion 27 of the internal surface of the pressure plate 1 is located substantially midway between the axial ends of the blind bore 25.

The polygonal rotation facilitating end portion 22 of the connecting element 20 is or resembles a hexagon. However, it is clear that such end portion can be replaced with a square end portion, with an end portion having two parallel flats disposed diametrically opposite one another, or with a portion having in its end face a polygonal or other non-circular recess for reception of the complementary working end of a suitable torque transmitting tool, not shown. The material which is surrounded by the groove 24 is destroyed in response to the application of a predetermined torque so that the end portion 22 is sheared off and the remainder of the connecting element 20 is ready to be converted into a fastening device. Such shearing off of the polygonal end portion 22 takes place when the end portion 21 is screwed into the blind bore 25 and the tool continues to rotate the end portion 22 while the major part of the connecting element 20 is incapable of penetrating deeper into the blind bore 25. The provision of a weakened portion which is surrounded by the groove 24 contributes to predictability of the locus where the end portion 22 is sheared off the remainder of the connecting element 20 prior to conversion of the intermediate portion 23 below the groove 24 into a rivet head. As can be seen in FIG. 9, the axial length of the intermediate portion 23 is selected in such a way that a part thereof extends outwardly (upwardly in FIG. 9) beyond the upper side 29d of the respective end portion 29b of the leaf spring 29 which is to be secured to the pressure plate 1. The end portion 29b has an opening 29c through which the intermediate portion 23 extends.

In the first step of converting the connecting element 20 of FIG. 7 into a fastening device of the type shown in FIG. 9, the externally threaded end portion 21 of the element 20 is introduced into the blind bore 25 so that its external thread mates with the internal thread 27. The polygonal rotation facilitating end portion 22 is engaged by a suitable torque transmitting tool, and the connecting element 20 is caused to penetrate deeper into the blind bore 25. The end portion 22 is sheared off the remainder of the connecting element 20 under the aforementioned circumstances, namely, when the tool continues to rotate the end portion 22 but the pressure plate 1 holds the portions 21 and 23 of the connecting element 20 against further rotation in the blind bore 25. That part of the intermediate portion 23 which then extends beyond the exposed side 29d of the leaf spring 29 is indicated in FIG. 9 by the reference character 30. The end portion 29b of the leaf spring 29 is preferably placed over the part 30 (so that the part 30 extends into and beyond the opening 29c) after the end portion 22 is separated from the remainder of the connecting element 20. The thus located end portion 29b abuts against the adjacent surface 10a of the pressure plate 1.

In the next step, the part 30 of the intermediate portion 23 is treated by a suitable tool, not shown, which converts it into a rivet head 20a that overlies a part of the upper side 29d in the region surrounding the opening 29c. The making of the rivet head 20a involves the application of axial stresses to the part 30 of the intermediate portion 23 so that the part 30 expands radially and becomes shorter. This also entails a complete filling of the opening 29c with plastically deformable material of the intermediate portion 23 as well as the establishment of pronounced frictional engagement between the lower part of the intermediate portion 23 (as viewed in FIG. 9) and the portion 26 of internal surface of the pressure plate 1. Consequently, the thus obtained fastening device safely holds the leaf spring 29 against the surface 10a of the pressure plate 1, and the fastening device also prevents undesirable angular movements of the end portion 29b about the axis of the rivet head 20a because the preferably non-circular opening 29c is filled with the material of the connecting element 20 and the portion 23 is in pronounced frictional engagement with the portion 26 of the internal surface of the pressure plate. The connecting element 20 is preferably a solid body (i.e., it need not have an axial passage or socket), and this accounts for radial expansion of the portion 23 in response to the application of axial stresses to the part 30 in order to convert such part into a rivet head 20a. In fact, even the end portion 21 is highly likely to undergo some deformation so that its external thread is in an even more satisfactory mesh with the internal thread 27 of the pressure plate 1.

The end portion 22 constitutes an optional feature of the connecting element 20. For example, the connecting element 20 can be furnished without the polygonal end portion 22 and the part 30 of the intermediate portion 23 can be provided with a diametrically extending slot (indicated at 31 in FIG. 9) which can receive the working end of a screwdriver in order to drive the major part of such truncated connecting element into the blind bore 25. The slot 31 disappears or is likely to disappear when the outwardly extending part 30 of the radially expandible portion 23 is converted into a rivet head 20a. The diametrically extending slot 31 can be replaced with a polygonal recess in the end face of the part 30 so that such recess can accept the polygonal working end of a torque transmitting tool, not shown.

Figure 10:
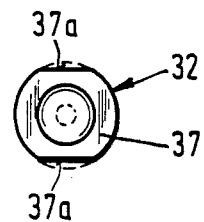
FIG. 10 is a plan view of a third connecting element.
Figure 11:
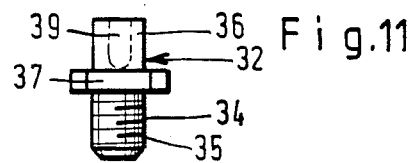
FIG. 11 is a side elevational view of the connecting element which is shown in FIG. 10.
Figure 12:
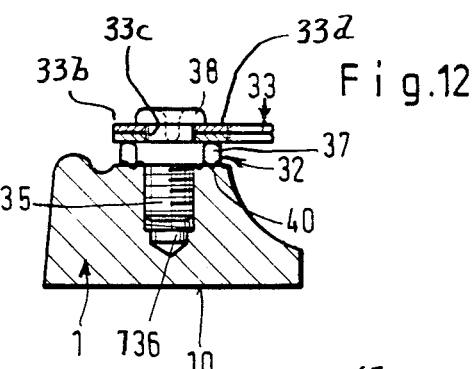
FIG. 12 shows a portion of a pressure plate and the connecting element of FIGS. 10 and 11 in fully inserted position.

FIGS. 10 and 11 illustrate a further connecting element 32 which can be converted into a fastening device serving to secure an end portion 33b of a leaf spring 33 to a pressure plate 1 so that the underside of the spring (as viewed in FIG. 12) abuts against the surface 40 of the pressure plate. The connecting element 32 comprises a first end portion 35 which has external threads 34, a deformable second end portion 36, and an intermediate portion 37 in the form of a collar having two facets or flats 37a (see FIG. 10) disposed diametrically opposite one another and serving to facilitate rotation of the connecting element 32 by a wrench or another suitable torque transmitting tool. The external thread 34 of the end portion 35 can mate with the internal thread of the surface bounding the blind bore 136 in the unfinished and hence rough and uneven surface 40 of the pressure plate 1. When the end portion 35 is driven into the blind bore 136, the underside of the collar 37 abuts against the rough surface 40 to prevent rotation of the connecting element 32 in either direction, and the opening 33c in the end portion 33b of the leaf spring 33 is thereupon caused to surround the radially expandible portion 36 before the latter is converted into a rivet head 38. The distance between the collar 37 and the tip of the end portion 35 determines the extent to which the connecting element 32 can be driven into the blind bore 136 of the pressure plate 1. The two flats 37a of the collar 37 can be replaced by a larger number of flats, e.g., by four or six flats which serve to facilitate rotation of the connecting element 32 by resorting to a suitable torque transmitting tool.

The end portion 36 of the connecting element 32 is preferably (but need not be) provided with a recess or passage 39 whose purpose is to facilitate conversion of a part of the end portion 36 into the rivet head 38. The recess 39 extends axially inwardly from the end face of the end portion 36. If desired, the recess 39 can extend into a part of the externally threaded end portion 35 or it can constitute a through hole extending all the way between the two end faces of the connecting element 32. The recess 39 or the just mentioned through hole need not be surrounded by a cylindrical surface; for example, such recess can be bounded by a polygonal (e.g., hexagonal) internal surface of the connecting element 32 so that the recess can receive the working end of a suitable tool which serves to drive the end portion 35 into the blind bore 136 until the collar 37 comes into abutment with the uneven surface 40 of the pressure plate 1. In such instance, the flats 37a of the collar 37 can be omitted (this is indicated in FIG. 10 by phantom lines).

The externally threaded end portion 35 is introduced into the blind bore 136 of the pressure plate 1 in a first step, either by rotating the connecting element 32 through the medium of the collar 37 or by a tool which is inserted into the recess 39. Introduction of the end portion 35 into the blind bore 136 is terminated when the underside of the collar 37 abuts against the surface 40 of the pressure plate 1. The end portion 33b of the leaf spring 33 is thereupon slipped over the end portion 36 so that the underside of the end portion 33b abuts against the upper side of the collar 37. In the final step, the connecting element 32 is converted into a fastening device by converting that part of the end portion 36 which extends beyond the upper side 33d of the leaf spring 33 into a rivet head 38. The latter overlies the upper side 33d in the region around the opening 33c. The making of the rivet head 38 results in radial expansion of the material of the end portion 36 so that the material fills the opening 33c; also, the radially expanded material of the connecting element 32 fills the grooves between the threads in the internal surface of the pressure plate 1 to ensure that the fastening device is highly unlikely to become loose. Of course, reliable retention of the fastening device in the blind bore 136 is further ensured due to the fact that the underside of the collar 37 bears against the raw (unfinished) surface 40 of the pressure plate 1. The plate 1 is normally a casting and its surface 10 is finished with a high degree of accuracy. However, the surface 40 remains unfinished and such unfinished surface cooperates with the adjacent underside of the collar 37 to prevent loosening of the fastening device which is obtained from the connecting element 32. The construction and mode of operation of the rivet head forming tool which is used to convert the end portion 36 into the head 38 form no part of the present invention. The head 38 holds the end portion 33b of the leaf spring 33 against the adjacent side of the collar 37, and the material of the end portion 36 below the head 38 fills the opening 33c so that the leaf spring 33 is held against rotation about the axis of the fastening device. The extent to which the end portion 35 is driven into the blind bore 136 of the pressure plate 1 is preferably such that the underside of the collar 37 undergoes at least some deformation and its contour conforms to the contour of the surface 40 so that the thus obtained form-locking connection between two at least substantially complementary uneven surfaces even more reliably prevents undesirable unwinding of the end portion 35 from the internal thread in the blind bore 136. Of course, the underside of the collar 37 can be caused to conform to the outline of the uneven surface 40 during conversion of the portion 36 into a rivet head 38, i.e., as a result of the application of axial force against the exposed end face of the portion 36.

Figure 13:
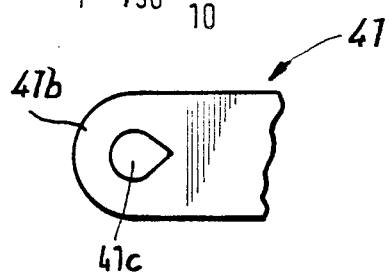
FIG. 13 is a fragmentary plan view of a leaf spring.

FIG. 13 illustrates one end portion 41b of a leaf spring 41. The end portion 41b has an opening 41c which resembles a tear drop, i.e., its outline deviates from a circular outline. The desirability of such configuration of the surface bounding the opening 41c has been pointed out above, i.e., when the opening 41c is filled with the plastically deformable material of a connecting element, the leaf spring is highly unlikely to turn about the axis of the respective fastening device. It is clear that the configuration which is shown in FIG. 13 is but one of a practically unlimited number of equivalent or practically equivalent configurations which achieve the same purpose, namely, of preventing angular movements of the leaf spring about the axis of the improved fastening device.

An important advantage of the improved fastening device is that its material invariably fills the opening in the second end portion of each leaf spring not later than upon completion of the deforming step, i.e., upon completion of the making of the rivet heads 14, 20a or 38. This ensures highly predictable and reliable transfer of forces between the pressure plate and the leaf springs as well as between the fastening devices and the leaf springs.

Radial expansion of that portion or those portions of each connecting element which extends or extend into the respective blind bore is highly desirable and advantageous because this ensures reliable anchoring of the connecting elements in the pressure plate. Such mode of anchoring the connecting elements in the pressure plate is simple and inexpensive and can be completed with little loss in time as well as with a very high degree of predictability. Moreover, radial expansion of that portion of each connecting element which extends into the respective blind bore ensures that each connecting element is maintained in large-area surface-to-surface contact with the pressure plate, i.e., the transfer of forces between each fastening device and the pressure plate is distributed over a large portion of the surface of the respective connecting element and the development of any play between the connecting elements and the pressure plate is highly unlikely or plain impossible under all anticipated operating conditions of the clutch. Absence of play means absence of unanticipated termination of connections between the leaf springs and the pressure plate with attendant increase in reliability and safety of the clutch. While it is also possible to anchor the connecting elements in the respective blind bores of the pressure plate by the simple expedient of tightly screwing the respective portions of the connecting elements into the pressure plate, at least some radial expansion of the connecting elements in the blind bores is highly advisable and beneficial for the useful life of the fastening devices and the friction clutch. Moreover, and as long as the connecting elements are made (at least in part) of a ductile material, some radial expansion of those portions of the connecting elements which extend into the respective blind bores can take place in automatic response to the making of rivet heads 14, 20a or 38. Absence of pronounced (or even any) radial expansion of that portion of each connecting element which extends into the respective blind bore is much less likely to result in the making of a less reliable connection between the pressure plate and the leaf springs if the connecting elements are provided with external threads which cut complementary threads in the internal surfaces of the pressure plate during introduction of portions of the connecting elements into the respective blind bores. The externally threaded surfaces of the connecting elements are then evidently in full contact with the respective internal surfaces of the pressure plate. The same holds true if the blind bores are tapped and the threads in such bores are designed to cut threads in the external surfaces of those portions of the connecting elements which are introduced into the respective blind bores. Such mode of anchoring the connecting elements in the pressure plate merely necessitates the provision of some rotation facilitating means on the outer parts of the connecting elements so that the connecting elements can be rotated during penetration into the respective blind bores, either to cut threads in the respective internal surfaces or to be provided with external threads by the internal threads in the respective blind bores. This mode of anchoring the connecting elements in the respective blind bores is especially simple and inexpensive because the spreading elements and/or tools can be dispensed with and the assembly of fastening devices merely involves the screwing of portions of connecting elements into the respective blind bores and subsequent formation of the rivet heads 14, 20a or 38.

If the connecting elements are anchored in the pressure plate by resorting to external threads on the respective portions of the connecting elements and/or to internal threads in the blind bores, such threads need not extend along the full axial length of each blind bore, i.e., it suffices to provide relatively short threads especially if the threading of portions of connecting elements into the respective blind bores is followed by, or takes place simultaneously with, at least some radial expansion of connecting elements in the pressure plate. Of course, the provision of threads which extend all the way between the open end and the deepmost portion of each blind bore (or along the full length of that portion of each connecting element which is to be introduced into the respective blind bore) evidently enhances the reliability of connections between the pressure plate and the fastening devices. It has been found that resort to relatively short threads normally suffices for the establishment of reliable connections, especially if the pressure plate and the connecting elements are formed and assembled in a manner as described in connection with FIGS. 7 to 9, i.e., if the internal surface surrounding the blind bore 25 of the pressure plate 1 has a relatively or entirely smooth portion 26 which is adjacent to the open end of the bore 25 so that the material of the portion 23 can expand against such portion 26 when the stub 30 of the portion 23 is converted into a rivet head 20a.

As a rule, the making of rivet heads 14, 20a or 38 results in sufficiently pronounced deformation of the connecting elements to ensure that the fastening devices establish permanent connections between the pressure plate and the respective leaf springs, even if the connecting elements are not subjected to radial expansion within the confines of the respective blind bores. In other words, mere screwing of portions of the connecting elements, followed by the making of rivet heads 14, 20a or 38, normally suffices to provide highly reliable connections capable of standing all kinds of abuse which are anticipated when the clutch is in actual use. This is due to the fact that the making of rivet heads results in the filling of openings of the respective end portions of the leaf springs with the material of the connecting elements, and also because the undersides of the rivet heads are in firm engagement with the adjacent exposed sides of the respective leaf springs which, in turn, are urged against the surface 10a or 40 of the pressure plate or against the upper sides of the respective collars 37. Therefore, the thus secured connecting elements are highly unlikely to turn in their blind bores, even if those portions of the connecting elements which extend into the blind bores are not subject to any radial expansion or are subjected only to such radial expanding forces which develop as a result of the making of rivet heads.

If the connecting elements are expanded into pronounced engagement with the surfaces surrounding the respective blind bores, the connections are sufficiently reliable (at least for most applications of the friction clutch) even if the blind bores are bounded by smooth internal surfaces of the pressure plate. However, at least some profiling of the internal surfaces of the pressure plate is advisable and advantageous because it greatly enhances the reliability of retention of connecting elements in the pressure plate. The provision of unevennesses on the internal surfaces of the pressure plate and/or on the external surfaces of those portions of the connecting elements which are anchored in the pressure plate not only reduces the likelihood that the fastening devices will begin to rotate with reference to the pressure plate but also practically excludes any undesirable axial movements of the connecting elements with reference to the pressure plate. While the cutting of threads constitutes a presently preferred mode of providing the pressure plate with uneven internal surfaces and/or of providing portions of connecting elements with uneven external surfaces, other modes of making uneven surfaces can be resorted to with equal or similar advantage. For example, the blind bores can be surrounded by internal surfaces having axially parallel or circumferentially extending grooves, such internal surfaces can be provided with hills and valleys in a pattern other than that of threads, and the same holds true for the external surfaces of portions of the connecting elements.

As mentioned above, the improved fastening devices can employ solid (see FIG. 7) or hollow or partially hollow connecting elements. Connecting elements in the form of tubes are preferred in many instances because they are simple and inexpensive and can be mass produced in available machines. As also mentioned above, the pressure plate can be provided with stops which are disposed in the blind bores and arrest the connecting elements when the connecting elements are introduced into the respective blind bores to the required extent. The provision of such internal stops obviates the need for collars of the type shown at 37 in FIGS. 10 to 12. The provision of stops (either in the form of shoulders in the blind bores or in the form of collars on the connecting elements) contributes to predictability of the making of rivet heads, i.e., if the length of each connecting element is the same and if each connecting element extends into the respective blind bore to the same extent, each connecting element can be readily provided with a rivet head of accurately determined size and shape, and each such rivet head will bear against the exposed side of the adjacent end portion of the respective leaf spring with the same force.

Radial expansion (if any) of the connecting elements in the respective blind bores and the making of rivet heads can but need not take place simultaneously. However, and as already explained above, at least some radial expansion of portions of ductile connecting elements in the blind bores is highly likely and practically certain to take place during deformation of the exposed outermost portions of the connecting elements, i.e., as a result of the application of axial forces which are needed to form the rivet heads.

The spreading element or tool 19a of FIG. 6 is resorted to if the manufacturer wishes to produce lightweight clutches and/or if the provision of fastening devices, each of which consists of a properly deformed connecting element with an open socket therein, is desirable for other reasons.

It is further clear that the improved fastening devices can be modified in a number of additional ways without departing from the spirit of the invention. For example, the features of the fastening devices of the type shown in FIGS. 1 to 4 (using spreading elements 13 or 18 or analogous spreading elements) can be combined with the features of fastening devices of the type shown in FIGS. 7 to 9 and/or FIGS. 10 to 12. Thus, and referring to FIG. 7, the connecting element 20 can be a tube which receives a spreading element upon separation of the polygonal rotation facilitating portion 23 from the remainder of the connecting element, i.e., upon completed screwing of the portion 21 into the blind bore 25 of the pressure plate 1. Also, the passage or recess 39 of the connecting element 32 can be made longer (or can constitute a through bore of this connecting element) so that it can receive a spreading element which expands the portion 35 into even more intimate contact with the internal surface surrounding the blind bore 136.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. In a friction clutch, particularly for use in motor vehicles, the combination of first and second rotary components, said first component being movable axially with reference to said second component; a deformable coupling member having a first portion secured to one of said components and a second portion provided with an opening and overlying the other of said components, said other component having a surface facing the second portion of said coupling member and a blind bore provided in said surface and in register with said opening, said coupling member having an outer side facing away from said other component; and means for fastening the second portion of said coupling, member to said other component, including a metallic connecting element anchored in the blind bore of said other component and extending through said opening, said connecting element including a deformed portion overlying said outer side in the region of said opening.

2. The combination of claim 1, wherein said other component constitutes a pressure plate and has a friction surface facing away from said coupling member, said one component constituting the housing of the clutch and said coupling member comprising a leaf spring, and further comprising a clutch disc adjacent to said friction surface and a clutch spring reacting against said housing and arranged to bear against said pressure plate so as to urge the latter toward engagement with said clutch disc.

3. The combination of claim 2, wherein said pressure plate is an annulus having inner and outer peripheral surfaces, said first named surface being disposed between said peripheral surfaces and said blind bore being disposed substantially midway between said peripheral surfaces.

4. The combination of claim 2, wherein the deformed portion of said connecting element constitutes or resembles a rivet head.

5. The combination of claim 2, wherein said connecting element further comprises a radially expanded second portion in engagement with that surface of the pressure plate which surrounds said blind bore.

6. The combination of claim 2, wherein said pressure plate has a threaded internal surface surrounding at least a portion of said blind bore and said connecting element further includes a second portion having an external thread mating with the thread of said internal surface.

7. The combination of claim 2, wherein said connecting element further includes a second portion which is confined in said blind bore, at least a part of the second portion of said connecting element having an external thread.

8. The combination of claim 2, wherein said connecting element further includes a second portion anchored in the blind bore and a larger-diameter additional portion disposed between said first named surface and the second portion of said leaf spring.

9. The combination of claim 8, wherein said additional portion includes a collar overlying said first named surface in the region surrounding the open end of said blind bore.

10. The combination of claim 8, wherein said additional portion constitutes a means for limiting the extent to which said connecting element extends into the blind bore of said pressure plate.

11. The combination of claim 8, wherein said first named surface of said pressure plate is uneven.

12. The combination of claim 11, wherein said pressure plate is a casting and said first named surface is the untreated surface of such casting.

13. The combination of claim 11, wherein said additional portion has a surface which abuts against and is at least in part complementary to said uneven surface so that such complementary surfaces oppose rotation of said connecting element with reference to said pressure plate.

14. The combination of claim 2, wherein said connecting element is in mesh with the pressure plate and includes means for facilitating its rotation by a torque transmitting tool.

15. The combination of claim 14, wherein said rotation facilitating means is separable from the remainder of the connecting element in response to the application of a predetermined torque thereto.

16. The combination of claim 15, wherein said rotation facilitating means constitutes that end portion of said connecting element which is remote from said blind bore and is outwardly adjacent to the outer side of the second portion of said leaf spring when said connecting element is in the process of being anchored in said blind bore.

17. The combination of claim 14, wherein said rotation facilitating means has a polygonal outline.

18. The combination of claim 14, wherein said rotation facilitating means has a transverse slot.

19. The combination of claim 14, wherein said rotation facilitating means has an end face and a polygonal tool-receiving recess in said end face.

20. The combination of claim 14, wherein said rotation facilitating means comprises a collar disposed between said first named surface and the second portion of said leaf spring.

21. The combination of claim 20, wherein said collar has a plurality of facets.

22. The combination of claim 20, wherein said collar has a hexagonal outline.

23. The combination of claim 2, wherein said connecting element comprises a first portion disposed in said blind bore and a second portion including said deformed portion, at least the second portion of said connecting element having an axially extending passage.

24. The combination of claim 23, wherein said connecting element has a polygonal internal surface surrounding at least a portion of said passage and being engageable by the external surface of a torque transmitting tool.

25. The combination of claim 2, wherein said pressure plate has an internal surface surrounding said blind bore and including a threaded first portion remote from and a substantially smooth second portion nearer to the open end of said blind bore, said connecting element further including an externally threaded portion meshing with the pressure plate in the region of the first portion of said internal surface and a radially expanded portion in engagement with and surrounded by the second portion of said internal surface.

26. The combination of claim 2, wherein said connecting element further comprises a radially expanded second portion disposed in said blind bore and/or in said opening, the radial expansion of the second portion of said connecting element being attributable to and taking place at least substantially simultaneously with the deformation of said deformed portion.

27. The combination of claim 2, wherein said pressure plate has an at least partially uneven internal surface surrounding at least a portion of said blind bore and said connecting element further includes a radially expanded second portion disposed in said blind bore and having an external surface which is in contact with and is at least substantially complementary to said uneven surface.

28. The combination of claim 27, wherein said uneven surface is threaded.

29. The combination of claim 2, wherein said connecting element further includes a second portion disposed in said blind bore and having a socket, said fastening means further comprising a spreading element received in said socket and maintaining the second portion of said connecting element in radially expanded condition of pronounced engagement with the pressure plate.

30. The combination of claim 29, wherein said socket has an open end in said deformed portion and extends substantially axially of said connecting element.

31. The combination of claim 29, wherein said socket includes a smaller-diameter portion and a larger-diameter portion, said spreading element filling at least the larger-diameter portion of said socket.

32. The combination of claim 31, wherein the smaller-diameter portion of said socket is located in said blind bore and said spreading element fills at least a part of said smaller-diameter portion.

33. The combination of claim 29, wherein said spreading element has a tapering end portion which is disposed in the interior of said blind bore.

34. The combination of claim 33, wherein said tapering end portion constitutes or resembles the frustum of a cone.

35. The combination of claim 34, wherein said tapering end portion has an apex angle of between approximately 30° and 60 degrees.

36. The combination of claim 35, wherein said apex angle is approximately 40 degrees.

37. The combination of claim 33, wherein said tapering end portion constitutes or resembles a hemisphere.

38. The combination of claim 29, wherein said connecting element is a tube and said deformed portion is formed as a result of introduction of said spreading element into said tube.

39. The combination of claim 29, wherein said spreading element has an end portion which tapers in a direction away from said blind bore and is at least substantially surrounded by the deformed portion of said connecting element.

40. The combination of claim 39, wherein the end portion of said spreading element constitutes or resembles the frustum of a cone.

41. The combination of claim 39, wherein the end portion of said spreading element constitutes or resembles a hemisphere.

42. The combination of claim 2, wherein said pressure plate has a stop which is provided in said blind bore and said connecting element further includes a second portion confined in said bore and having an end face abutting against said stop.

43. The combination of claim 2, wherein said opening has an outline which deviates from a circular outline, said connecting element further including a plastically deformable portion which fills said opening.

44. In a friction clutch, particularly for use in motor vehicles, the combination of substantially coaxial first and second componnets, one of said components including a pressure plate which is movable axially with reference to the other of said components;
means for biasing said pressure plate axially;
a plurality of leaf springs for transmitting torque between said components, each of said leaf springs having a first portion secured to said other component and a second portion having an opening overlying said pressure plate and an exposed side facing away from the pressure plate;
and rivets for fastening the second portions of said leaf springs to said pressure plate, each of said rivets having a shank anchored in a recess of said pressure plate and extending into the opening of the respective second portion, and a single head overlying the exposed side of the respective second portion.

45. The combination of claim 44, wherein said pressure plate has bores for the shanks of said rivets and profiled internal surfaces surrounding said bores.

46. The combination of claim 45, wherein said bores are blind bores.

47. The combination of claim 44, wherein each of said heads constitutes a deformed portion of the respective shank.

48. The combination of claim 44, wherein said pressure plate has bores for the shanks of said rivets and each of said shanks includes a hollow portion which consists at least in part of a ductile material and is expanded radially into contact with the surface surrounding the respective bore.

49. In a friction clutch, particularly for use in motor vehicles, the combination of substantially coaxial first and second components, one of said components including a pressure plate which is movable axially with reference to the other of said components;
means for biasing said pressure plate axially;
a plurality of leaf springs for transmitting torque between said components, each of said leaf springs having a first portion secured to said other component and a second portion having an opening overlying said pressure plate and an exposed side facing away from the pressure plate;
and rivets for fastening the second portions of said leaf springs to said pressure plate, each of said rivets having a shank anchored in said pressure plate and extending into the opening of the respective second portion, and a single head overlying the exposed side of the respective second portion, said pressure plate including an annulus having inner and outer peripheral surface and said rivets being disposed between said peripheral surfaces.

* * * * *